United States Patent [19]
Gärtner

[11] Patent Number: 5,117,115
[45] Date of Patent: May 26, 1992

[54] DEVICE FOR MEASURING THE ACTIVITY AND VOLUME OF RADIOACTIVE LIQUIDS

[75] Inventor: Karl Gärtner, Hall/Tirol, Austria

[73] Assignee: Bender & Co., Gesellschaft m.b.H., Vienna, Austria

[21] Appl. No.: 635,120
[22] PCT Filed: Sep. 8, 1989
[86] PCT No.: PCT/AT89/00082
 § 371 Date: Feb. 27, 1991
 § 102(e) Date: Feb. 27, 1991
[87] PCT Pub. No.: WO90/02962
 PCT Pub. Date: Mar. 22, 1990

[30] Foreign Application Priority Data
Sep. 13, 1988 [AT] Austria .................................. 2238/88

[51] Int. Cl.$^5$ ............................................. G01T 1/167
[52] U.S. Cl. ..................... 250/432 R; 250/370.01; 250/394
[58] Field of Search ............... 250/336.1, 432 R, 435, 250/394, 364, 370.01, 432 PD

[56] References Cited
U.S. PATENT DOCUMENTS
4,197,456  4/1980  Fleischer et al. ................. 250/303
4,658,142  4/1987  Johnson et al. ................. 250/394

FOREIGN PATENT DOCUMENTS
1604103  12/1981  United Kingdom .

*Primary Examiner*—Carolyn E. Fields
*Attorney, Agent, or Firm*—Marmorek, Guttman & Rubenstein

[57] ABSTRACT

Device for the measuring of the activity and the volume of radioactive liquids with a shielding housing with a first chamber containing a vessel provided with a central hollow space and a ring chamber receiving the electrically conductive liquid to be investigated and with a second chamber separated from the first chamber by a wall with a vertical row of windows placed one above the other and in which a vertical row of sensors assigned to the row of windows is provided, each of said sensors being connected to an amplifier and to a counting device, whereby two separate rod-shaped electrodes dip into the vessel contained in the first chamber, one of these electrodes dipping into the ring chamber and being subjected to high-frequency impulses, while the other electrode extends inside the central hollow space of the container and is connected via an amplifier to a measuring device.

5 Claims, 2 Drawing Sheets

DEVICE FOR MEASURING THE ACTIVITY AND VOLUME OF RADIOACTIVE LIQUIDS

The instant invention relates to a device for measuring the activity and volume of radioactive liquids. It relates in particular to the investigation of radioactive liquids decanted into decanting devices or similar installations in a plurality of individual containers, e.g. for the elution of technetium, whereby the measuring device constitutes an integral part of these installations.

To be able to measure the activity of the liquids to be decanted in such installations in a plurality of containers it was necessary in the past to take a measured portion of the liquid from the individual containers and to examine it separately in an ionization chamber, whereby relatively high voltages (600 V) are used and whereby the system tends to fatigue very rapidly when high activities are measured. Direct measuring of the activity of the liquid to be decanted into the containers, i.e. a direct counting of the counts per volume unit has not been possible with the known installation.

The instant invention has as its objects to create a measuring device making it possible to measure directly the radioactivity and at the same time the volume of radioactive liquids to be decanted into individual containers. The measuring device according to the instant invention is characterized by a combination of the characteristics that it is provided with a shielding housing and with a first chamber containing a vessel provided with a central hollow chamber and a ring chamber receiving the electrically conductive liquid to be examined, said ring chamber being provided with an inlet and an outlet for the liquid, and with a second chamber which is separated from the first chamber by a wall with a vertical row of windows placed one above the other and in which a second housing is provided adjoining to these windows, said second chamber serving for optical and electrical shielding and being provided with a vertical row of sensors, in particular semiconductor crystals, assigned to the row of windows within said housing, each of which is connected to an amplifier and to a counting device, whereby two separate rod-shaped electrodes dip into the vessel placed in the first chamber, one of said electrodes dipping into the ring chamber and being subjected to high-frequency impulses while the other electrode extends into the central hollow chamber of the container and is connected via an amplifier to a measuring device.

This design makes it possible to measure directly the radioactivity (counts per volume unit) of the liquid which may for example be fed from a technetium generator into the vessel and then from same into a receiving container, because the sum of the sensor signals is a measure for the overall radiation, whereby the volume of the liquid in the container can be ascertained at the same time. These measuring results are obtained without having to transfer part of the liquid and without a tendency of the measuring system to show signs of fatigue.

The second housing used for optical and electrical shielding is preferably made of aluminum.

In a variant of the embodiment serving to technologically measure technetium impurities an additional vertical row of windows is provided in the separation wall of the first shielding housing, with a row of silicon crystals in the second shielding housing being assigned to said row of windows and being shielding against the windows by an additional shielding film against technetium radiation, said film serving to receive radiation coming from technetium impurities, in particular from molybdenum.

Figure 1:
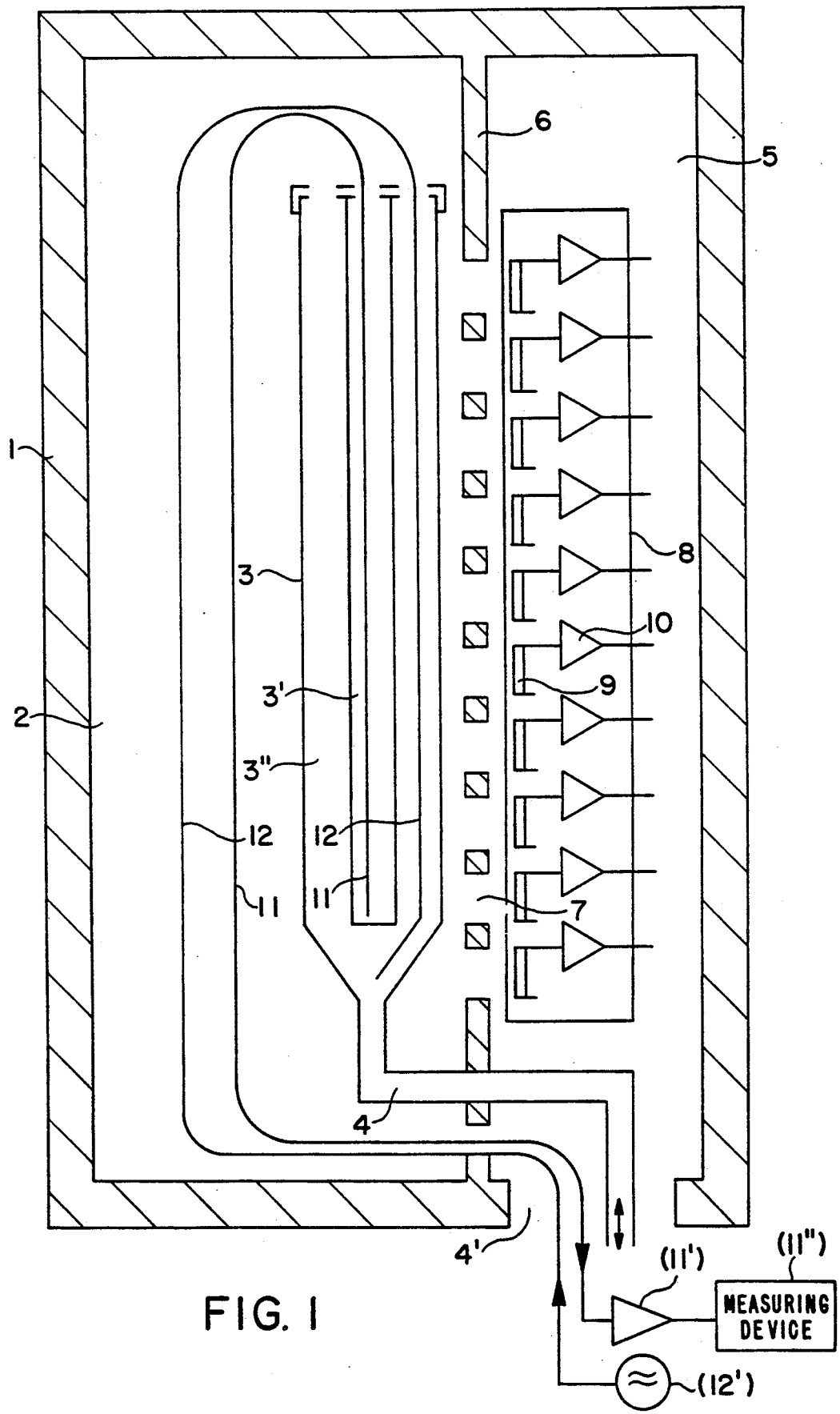
FIG. 1 depicts a cross-sectional view of a measuring device according to the present invention.

The invention is explained in greater detail below with reference to the drawing in which a device according to the invention is shown in schematic section.

The measuring device shown in FIG. 1, is provided with a housing 1 made of lead with a vertical first chamber 2 in which a vessel 3 which may be made of a synthetic material for instance is fixedly installed and is provided with a central hollow chamber 3' and a ring chamber 3" equipped with an inlet/outlet 4 for the radioactive liquid to be investigated which is taken out through a housing opening 4'. The liquid may for instance be supplied from a technetium generator and the measured liquid be guided into a receiving container. In housing 1 which serves as a radiation shield a second chamber 5 is provided and is separated from the first chamber 2 by a wall 6 having a vertical row of perforations or windows 7. Adjoining these windows 7 a second housing 8 made of aluminum and used for optical and electrical shielding is provided, said housing 8 containing a vertical row of semiconductor crystals 9 (photo-diodes or silicon photo cells) assigned to the windows 7, each of these being connected to an amplifier 10 and to a counting device (not shown).

During operation each of the semiconductor crystals 9 receives the activity or gamma radiation from the liquid in vessel 3 via its assigned window 7. The rays impact the semiconductor crystal 9 and knock electrons out of it, said electrons producing electrical impulses that can be counted after appropriate electrical amplification. The actual counts are thus counted directly in the device according to the instant invention. The higher the liquid level in vessel 3 in the first chamber 2, the greater the number of counters activated. The counted impulses are added up in the assigned circuit and show the overall activity.

By means of electrodes 11, 12 dipping into the vessel 3 in the first chamber 3 the volume of the liquid in vessel 3 consisting for example of technetium dissolved in an electrically conductive liquid such as a NaCl solution can be measured at the same time. The measurement of the level is based on the principle of capacitive coupling. The electrodes 11, 12 consist of two Nirosta rods, i.e. one emitter rod 12 subjected by an oscillator 12' with high-frequency rectangular impulses (e.g. 100 kHz) which transmits the impulses to the liquid in the ring chamber 3", and of a receiver rod 11 located inside the hollow space 3' of the vessel 3, the high-frequency output signals of which are guided via an amplifier to a display or measuring device.

The impulse amplitude depends on the liquid column surroundaing the emitter rod 12. The higher the liquid level, the stronger is the capacitive coupling and all the stronger are the impulses on the receiver side.

Within the framework of the instant invention the concentration can also be determined by calculating the quotient of the found values. The measured results can be evaluated electronically in a known manner. The measuring device according to the instant invention may, for example, comprise an amplifier 11', connected to the receiver rod 11, which amplifies the received signals for detection by a measuring device 11". The measuring arrangement used functions advantageously with a low supply voltage (e.g. a maximum of ±18 V) and at room temperature.

Technetium impurities, in particular of molybdenum, can be measured by means of a variant of the embodiment according to the instant invention. If a technetium generator is eluted it must always be ensured that no molybdenum is present in the eluate (molybdenum break-through). For this it has been necessary in the past to take out a certain quantity of the eluate and to investigate it in its own measuring chamber.

Figure 2:
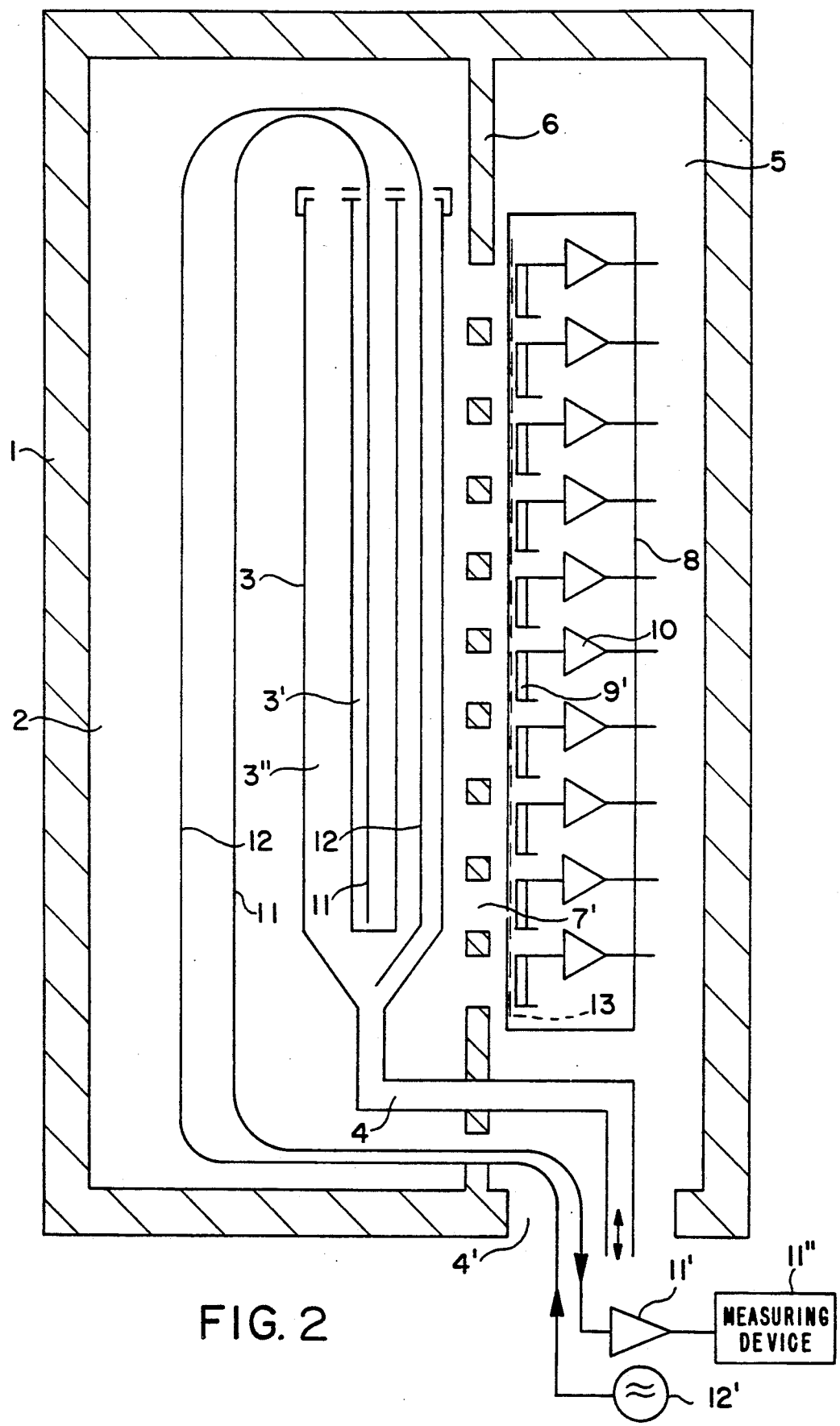
FIG. 2 depicts a cross-sectional view of an embodiment of a device for measuring the impurities of technetium.

Referring now to FIG. 2, according to the instant invention additional vertical rows of windows 7', analogous to and offset from the windows 7 are now provided in the wall of the first shielding housing 1. In the second shielding housing 8 a vertical row of semiconductor crystals 9', in particular silicon crystals, is assigned to these windows 7', whereby an appropriate shielding film 13 (e.g., made of lead) which absorbs the technetium radiation is placed in front of the silicon crystals. Since technetium has a lower radiation intensity than molybdenum, the harder molybdenum radiation which contains more energy penetrates the shielding 13 and can be measured. The instant invention can be used to special advantage with an installation described in AT-PS 379,253.

It goes without saying that the embodiment described can be varied under the invention, in particular with respect to the design of the counting circuit. Furthermore a nucleation filter and a ventilation and exhaust installation can be provided in the housing opening 4'.

I claim:

1. A device for measuring the activity and volume of a radioactive, electrically conductive liquid comprising a first shielding housing having a first chamber containing a vessel, said vessel having a central hollow space and a ring chamber comprising means for receiving and discharging the electrically conductive liquid, a second chamber separated from the first chamber by a wall containing a vertical row of windows formed one above another therein and a second shielding housing adjoining these windows comprising means for optical and electrical shielding and containing a vertical row of sensors, each of said sensors being assigned to one of said windows and being connected to an amplifier and a counting device, means for generating high frequency impulses, and first and second electrodes extending into said vessel, said first electrode extending into said ring chamber and being subjected to high frequency impulses from said means for generating high frequency impulses, said second electrode extending into said central hollow space and being connected via an amplifier to a measuring device.

2. The device of claim 1 wherein said second shielding housing is made of aluminum.

3. The device of claim 1 wherein said sensors are semiconductor crystals.

4. The device of claim 1 wherein said sensors are silicon crystals.

5. The device of claim 1 wherein said wall further comprises a second vertical row of windows formed therein, and said second shielding housing further comprises a second vertical row of sensors associated with the second row of windows, each of said second sensors having a technetium radiation shielding film placed in front of said second sensors, whereby the presence of technetium impurities may be detected.

* * * * *